US012650081B2

(12) United States Patent

Schneider-Die-Gross et al.

(10) Patent No.: US 12,650,081 B2

(45) Date of Patent: Jun. 9, 2026

(54) COMPOSITE TURBOMACHINE PART FORMED OF A CORE SURROUNDED BY TWO 3D WOVEN FIBROUS PREFORMS

(71) Applicant: SAFRAN AIRCRAFT ENGINES, Paris (FR)

(72) Inventors: Julien Paul Schneider-Die-Gross, Moissy-Cramayel (FR); Thomas Gallet, Moissy-Cramayel (FR); Jérémy Guivarc'h, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/550,879

(22) PCT Filed: Mar. 7, 2022

(86) PCT No.: PCT/FR2022/050405

§ 371 (c)(1),
(2) Date: Sep. 15, 2023

(87) PCT Pub. No.: WO2022/195192

PCT Pub. Date: Sep. 22, 2022

(65) Prior Publication Data

US 2024/0151148 A1 May 9, 2024

(30) Foreign Application Priority Data

Mar. 17, 2021 (FR) ...................................... 2102688

(51) Int. Cl.
*F01D 5/28* (2006.01)
*F01D 5/14* (2006.01)

(52) U.S. Cl.
CPC ............ *F01D 5/282* (2013.01); *F01D 5/147* (2013.01); *F05D 2300/6034* (2013.01)

(58) Field of Classification Search
CPC .. F01D 5/282; F01D 5/147; F05D 2300/6034; F05D 2300/603;

(Continued)

(56) References Cited

U.S. PATENT DOCUMENTS 9,162,750 B2 10/2015 Coupe et al.
9,616,629 B2 4/2017 Fabre et al.

(Continued)

FOREIGN PATENT DOCUMENTS

EP 2 516 263 B1 9/2014
EP 3 511 240 B1 2/2020

OTHER PUBLICATIONS

International Search Report as issued in International Patent Application No. PCT/FR2022/050405, dated Jul. 20, 2022.

*Primary Examiner* — Courtney D Heinle
*Assistant Examiner* — Andrew Thanh Bui
(74) *Attorney, Agent, or Firm* — CUSHMAN PARTNERS LLC

(57) ABSTRACT

A turbomachine part includes a central core which includes a first face and a second face opposite the first face, wherein the central core is surrounded firstly by a first external skin made of a composite material with a first fibrous reinforcement woven according to a three-dimensional weaving located on the first face of the central core, and secondly by a second external skin made of a composite material with a second fibrous reinforcement woven according to a three-dimensional weaving located on the second face of the central core.

13 Claims, 2 Drawing Sheets

(58) Field of Classification Search
CPC . F05D 2300/6033; B29B 11/16; B29C 70/24; D03D 25/005
See application file for complete search history.

(56) References Cited

U.S. PATENT DOCUMENTS

| | | | | |
|---|---|---|---|---|
| 2002/0076541 | A1* | 6/2002 | Jarmon | F23R 3/007<br>264/44 |
| 2008/0075602 | A1* | 3/2008 | Hill | F01D 5/147<br>416/240 |
| 2010/0254821 | A1* | 10/2010 | Parkin | F01D 5/282<br>156/286 |
| 2011/0311368 | A1* | 12/2011 | Coupe | B29C 70/24<br>416/241 A |
| 2013/0017093 | A1* | 1/2013 | Coupe | B29C 70/72<br>416/230 |
| 2014/0234114 | A1* | 8/2014 | Schibsbye | F03D 1/0675<br>416/226 |
| 2014/0369848 | A1* | 12/2014 | Marchal | B29C 70/222<br>139/384 R |
| 2017/0101730 | A1* | 4/2017 | Gilbertson | D03D 11/02 |
| 2018/0319101 | A1 | 11/2018 | Lanfant et al. | |
| 2019/0255738 | A1 | 8/2019 | Risicato et al. | |
| 2020/0378042 | A1 | 12/2020 | Lefebvre et al. | |

* cited by examiner

[Fig. 1]
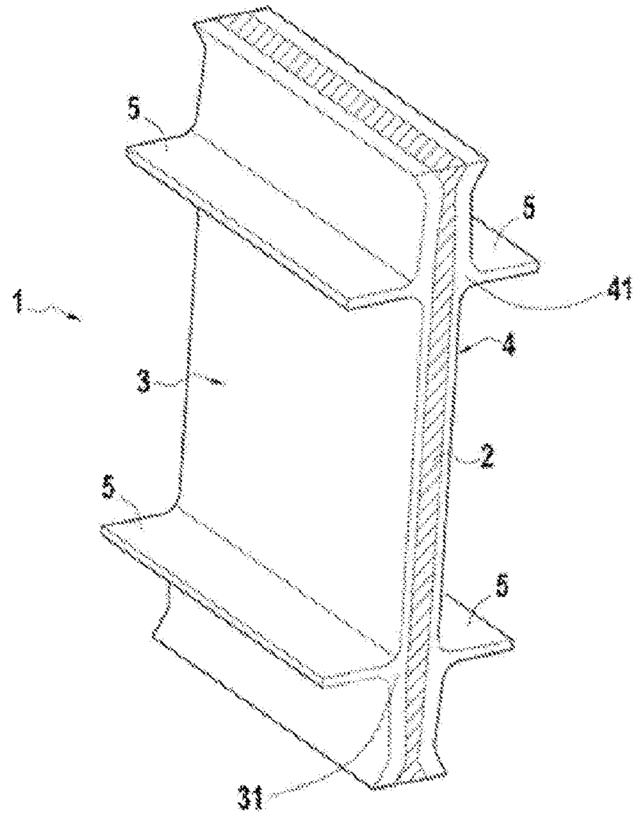
[Fig. 2]
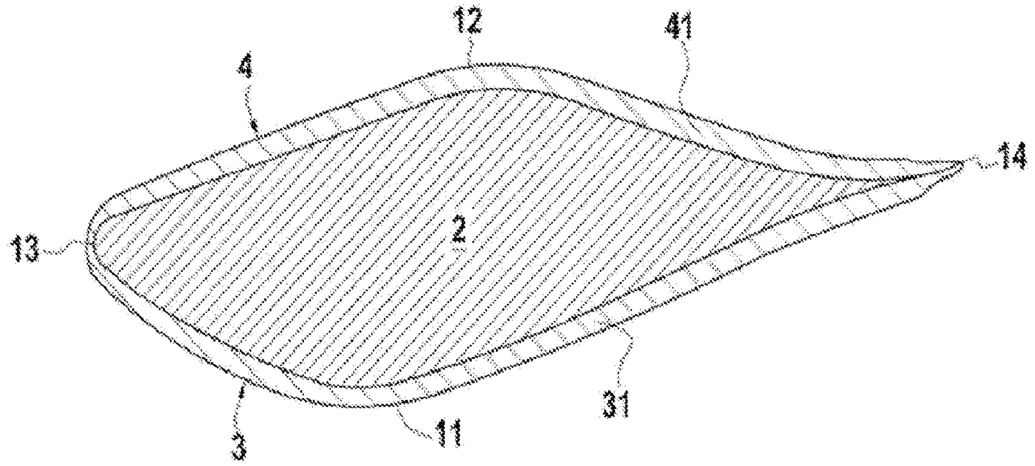

[Fig. 3A-3C]
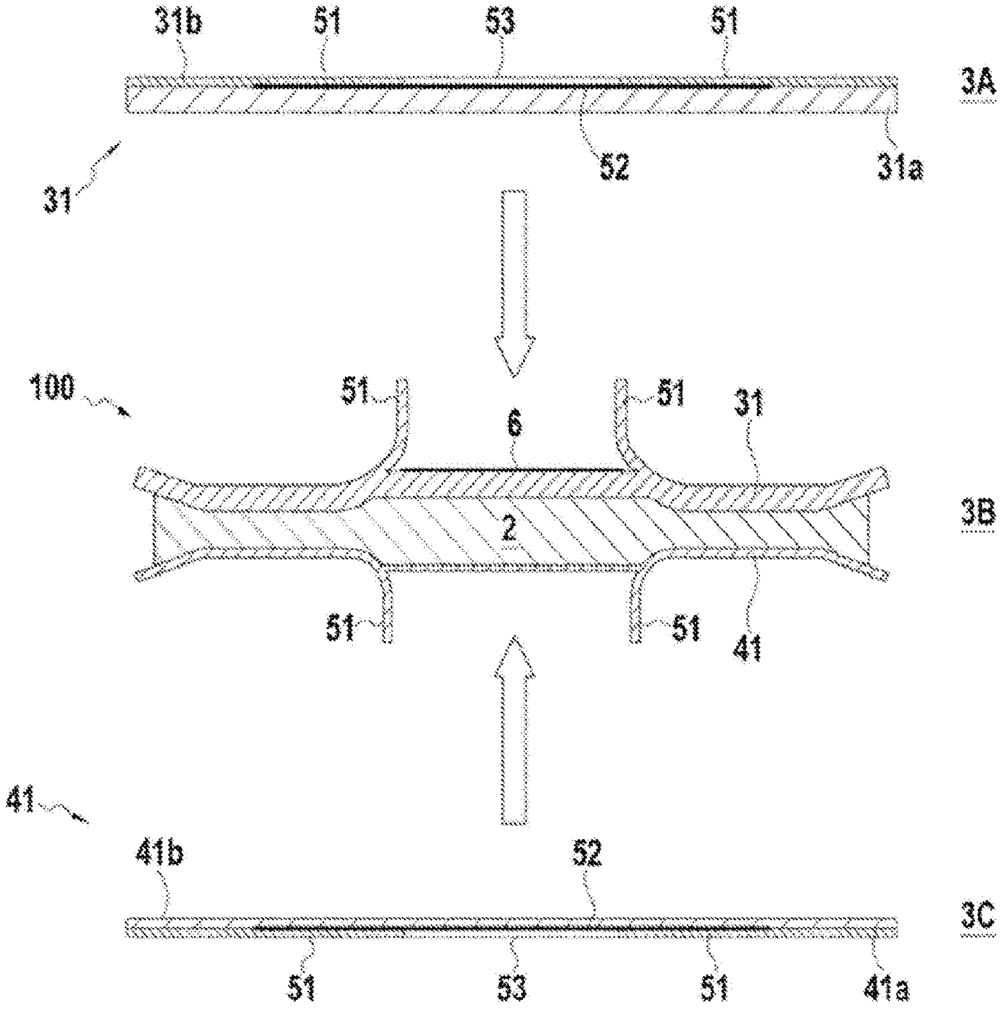
[Fig. 4]
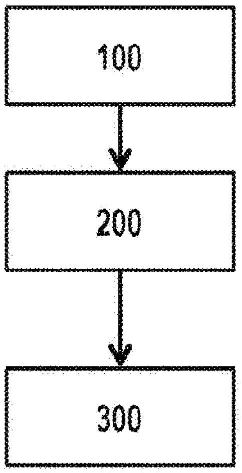

COMPOSITE TURBOMACHINE PART FORMED OF A CORE SURROUNDED BY TWO 3D WOVEN FIBROUS PREFORMS

CROSS-REFERENCE TO RELATED APPLICATIONS

This application is the U.S. National Stage of PCT/FR2022/050405, filed Mar. 7, 2022, which in turn claims priority to French patent application number 21 02688 filed Mar. 17, 2021. The content of these applications are incorporated herein by reference in their entireties.

TECHNICAL FIELD

The present invention relates to the general field of composite turbomachine parts formed of a central core surrounded by an external skin.

The present invention is applicable, in particular, in the field of turbomachine blades, for example diffuser vanes.

PRIOR ART

It is known to manufacture composite parts formed of a central core which is surrounded by an external skin, the skin contributing the mechanical properties to the part, while the core makes it possible to reduce the mass.

Such a composite design is advantageous for parts which undergo bending stresses.

It is also known to use 3D woven fibrous preforms in the manufacture of such composite parts.

For the manufacture of a part having fine edges, it is known to manufacture a 3D woven fibrous preform forming a sheath, inside which the core is inserted. However, such a solution can lead to the appearance of defects such as pinching or hooked strands while inserting the central core into the sheath formed by the fibrous preform. In addition, the fact that the 3D woven fibrous preform is a sheath imposes weaving constraints, for example the total number of layers is identical over the entire height of the sheath, thus limiting the choice of design for the part.

DISCLOSURE OF THE INVENTION

Therefore, the main object of the present invention is to provide a solution addressing the above-described problems.

According to a first aspect, the invention relates to a turbomachine part comprising a central core which comprises a first face and a second face opposite the first face, characterised in that the central core is surrounded firstly by a first external skin made of a composite material comprising a first fibrous reinforcement woven according to a three-dimensional weaving, located on the first face of the central core, and secondly by a second external skin made of a composite material comprising a second fibrous reinforcement woven according to a three-dimensional weaving, located on the second face of the central core.

Such a part can locally adapt the fibrous reinforcement to the local stresses of the part. In addition, such a part enables fine edges to be manufactured.

According to a possible feature, the first fibrous reinforcement and the second fibrous reinforcement have a different weaving pattern.

According to a possible feature, the first fibrous reinforcement and the second fibrous reinforcement have a different strand size.

According to a possible feature, the first fibrous reinforcement and the second fibrous reinforcement have a different number of layers.

According to a possible feature, at least one among the first fibrous reinforcement and the second fibrous reinforcement comprises a first portion having a first strand size, and a second portion having a second strand size.

According to a possible feature, the part comprises a platform formed by at least one debound region formed on the first fibrous reinforcement or the second fibrous reinforcement, said debound region being bent back so as to protrude from said part.

According to a possible feature, a reinforcement ply is located on at least one among the first external skin and the second external skin, the reinforcement ply being a ply woven by two-dimensional weaving, or a ply woven by three-dimensional weaving, or a sheet of unidirectional fibres.

According to a possible feature, the part is a profiled part which comprises a suction side, a pressure side, a leading edge and a trailing edge, the first external skin being disposed on the pressure side and the second external skin being disposed on the suction side.

According to a possible feature, the first external skin and the second external skin join at the leading edge and at the trailing edge.

According to a possible feature, at least one among the first external skin and the second external skin has a thickness which decreases at the leading edge, and at least one among the first external skin and the second external skin has a thickness which decreases at the trailing edge.

According to a possible feature, the first fibrous reinforcement comprises at least one among:

- a weaving pattern different from the weaving pattern of the second fibrous reinforcement;
- larger strands than the strands of the second fibrous reinforcement;
- a higher number of layers than the number of layers of the second fibrous reinforcement;
- a lower warp/weft ratio than the warp/weft ratio of the second fibrous reinforcement.

According to a second aspect, the invention relates to a method for manufacturing a part according to any of the possible features, comprising the following steps:

- manufacturing the first fibrous reinforcement and the second fibrous reinforcement by three-dimensional weaving;
- placing the first fibrous reinforcement and the second fibrous reinforcement around the central core so as to surround said central core, the first fibrous reinforcement being disposed against the first face of the central core, and the second fibrous reinforcement being disposed against the second face of the central core;
- densifying the first fibrous reinforcement and the second fibrous reinforcement in order to form the first external skin and the second external skin.

BRIEF DESCRIPTION OF THE FIGURES

Other features and advantages of the present invention will become apparent from the description given below, with reference to the appended drawings which illustrate an exemplary embodiment that is in no way limiting.

FIG. 1 schematically shows a turbomachine part, according to a possible embodiment of the invention.

FIG. 2 schematically shows a sectional view of a turbomachine profiled part, according to a possible embodiment of the invention.

FIGS. 3A, 3B and 3C schematically shown and exemplary embodiment of a preform of the part from FIG. 1.

FIG. 4 schematically shows the various steps of a method for manufacturing a part according to a possible implementation of the invention.

DESCRIPTION OF THE EMBODIMENTS

As illustrated in FIG. 1, a turbomachine part 1 comprises a central core 2 which is surrounded by a first external skin 3 comprising a first fibrous reinforcement 31 densified by a matrix and a second external skin 4 comprising a second fibrous reinforcement 41 densified by a matrix. The first external skin 3 and the second external skin 4 are disposed on either side of the central core, hence the first external skin 3 is located on a first face of the central core 2 and the second external skin 4 is located on a second face of the central core 2 which is opposite the first face of the central core 2.

As shown in FIG. 2, the turbomachine part 1 can be a part having a profiled cross-section with a pressure side 11, a suction side 12, a leading edge 13 and a trailing edge 14. Indeed, the invention is particularly suitable for the stresses encountered by blades. The part can be, in particular, a rotor blade or a stator vane, such as a diffuser vane, for example (also known as an "outlet guide vane", OGV). Indeed, the composite structure of the invention is particularly well suited for diffuser vanes.

The first external skin 3 and the second external skin 4 are made of a composite material, each comprising a fibrous reinforcement woven according to a three-dimensional weaving, densified by a matrix, for example a filled or not-filled resin. More precisely, the first external skin 3 is formed by a first fibrous reinforcement 31 densified by a matrix, and the second external skin 4 is formed by a second fibrous reinforcement 41 densified by a matrix.

Here, the term "three-dimensional weaving" or "3D weaving" shall mean a weaving for which the warp yarns cross several layers of weft yarns, or the weft yarns cross several layers of warp yarns.

Such a composite part 1 makes it possible to have a reduced mass through the use of a core made of lightweight material while providing the part 1 with the mechanical properties enabling it to withstand the stresses of use of the part 1 due to the external skins 3 and 4 with 3D woven fibres reinforcements. More precisely, the central core 2 is made of rigid cellular material; in other words, a material having a low density, such as a foam or a honeycomb structure. The central core can be produced by moulding or by machining a rigid block of cellular material. The core is preferably free of composite material comprising a fibrous reinforcement woven according to a three-dimensional weaving, densified by a matrix in order to minimise the overall mass of the part.

In addition, the fact that the first external skin 3 and the second external skin 4 are distinct makes it possible to adapt the features of the two external skins 3 and 4 to the stresses encountered by each of the faces of the part 1.

Hence, the first fibrous reinforcement 31 and the second fibrous reinforcement 41 can have a different weaving pattern, thus making it possible to adapt the weaving pattern to the local stresses encountered by the face of the part 1.

The first fibrous reinforcement 31 and the second fibrous reinforcement 41 can also have strands with different sizes, thus making it possible to locally increase the strength of the part 1 while limiting the increase in mass of the part 1. Here, the size of the strand refers to the thickness of the strands which compose the yarns of the fibrous preforms 31, 41.

The first fibrous reinforcement 31 and the second fibrous reinforcement 41 can also have a different warp/weft ratio, thus making it possible to locally adapt the mechanical properties of the part 1. Here, warp/weft ratio refers to the ratio between the number of warp yarns and the number of weft yarns for each fibrous reinforcement 31, 41.

The first fibrous reinforcement 31 and the second fibrous reinforcement 41 can also have a different number of layers, also making it possible to locally increase the strength of the part 1 while limiting the increase in mass of the part 1. Here, number of layers refers to the number of layers of weft yarns or of warp yarns.

Furthermore, the first fibrous reinforcement 31 and/or the second fibrous reinforcement 41 can comprise a first portion having a first strand size, and a second portion having a second strand size different from the first strand size. The two portions are 3D woven. A higher number of portions is also possible. It is also possible to use fibrous reinforcements in one portion.

FIGS. 3A to 3C illustrate the formation of a preform for the production of the part 1. More precisely, FIGS. 3A and 3C respectively show exemplary embodiments of the first fibrous reinforcement 31 and of the second fibrous reinforcement 41 before their shaping and their impregnation with a resin. FIG. 3B shows the assembly of the first and second fibrous reinforcements 31 and 41 on the central core 2 and their shaping so as to form a preform 100 of the part 1.

In the exemplary embodiment illustrated in FIGS. 3A to 3C, the first fibrous reinforcement 31 comprises a first portion 31*a* having a first strand size, and a second portion 31*b* having a second strand size, the first strand size being greater than the second strand size. In addition, the second fibrous reinforcement 41 also comprises a first portion 41*a* and a second portion 41*b*, however the first portion 41*a* and the second portion 41*b* have strands of identical size. The fact of using fibrous preforms made in two portions makes it possible, in particular, to form platforms on the part 1, as will be specified below.

As can be seen in FIG. 1, the part 1 can comprise one or more platforms 5 formed on the first external skin 3, and/or on the second external skin 4. The one or more platforms 5 can, for example, be used for the attachment of the part 1 in the turbomachine, or be used to delimit the air stream in the turbomachine.

As illustrated in FIGS. 3A to 3C, the platforms 5 can be formed by debound regions 51 of the fibrous reinforcements 31 and 41, these debound regions 51 being obtained by a debound region 52 between the first portion and the second portion which form the fibrous reinforcement. Furthermore, when the debound regions 51 are formed on a fibrous reinforcement, the fibrous reinforcement also comprises a drop region 53 formed only of warp yarns and which is then cut in order to release the one or more debound regions 51 initially connected to said drop region 53. Once the one or more debound regions 51 are released, the one or more debound regions 51 are folded towards the outside of the part 1 in order to form the platforms 5 once the fibrous reinforcement has been impregnated by a matrix precursor resin (FIGS. 1 and 2). The shaping of the debound regions 51 can be produced, in particular, with the mould for densifying the fibrous reinforcements 31, 41.

In addition, as illustrated in FIG. 3B, a reinforcement ply 6 can be deposited on the first external skin 3 or on the second external skin 4, or both on the first fibrous reinforcement 31 and/or on the second fibrous reinforcement 41 (not shown in FIG. 3B). The reinforcement ply 6 can locally improve the mechanical properties of the part 1. The reinforcement ply 6 can also increase the resistance to erosion of the part 1. According to a first possible alternative, the reinforcement ply 6 is formed by a ply woven by three-dimensional weaving.

According to a second possible alternative, the reinforcement ply 6 is formed by a ply woven by two-dimensional weaving. Here "two-dimensional weaving" shall mean a conventional mode of weaving by which each weft yarn passes from one side to the other of yarns of a single warp layer, or vice versa.

According to a third possible alternative, the reinforcement ply 6 is formed by sheets of unidirectional fibres (UD), which can be obtained by automatic fibre placement (AFP), or by filament winding. The direction of the fibres is adapted according to the mechanical properties of the part 1 to be reinforced.

As can be seen in FIG. 2, the first external skin 3 is disposed on the pressure side 11, and the second external skin 4 is disposed on the suction side 12. According to an advantageous feature, the first external skin 3 is more reinforced than the second external skin 4. The first external skin 3 and the second external skin 4 join at the leading edge 13 and at the trailing edge 14, thus completely surrounding the central core 2.

Hence, the first fibrous reinforcement 31 of the first external skin 3 can comprise larger strands than the strands of the second fibrous reinforcement 41 of the second external skin 4. The first fibrous reinforcement 31 of the first external skin 3 can also comprise a higher number of layers than the number of layers of the second fibrous reinforcement 41 of the second external skin 4 and, consequently, be thicker.

The first fibrous reinforcement 31 of the first external skin 3 has a lower warp/weft ratio than the warp/weft ratio of the second fibrous reinforcement 41 of the second external skin 4.

In addition, in order to form the fine edges of the blade that are the leading edge 13 and the trailing edge 14, the first external skin 3 and/or the second external skin 4 have a thickness which decreases at the leading edge 13, and the first external skin 3 and/or the second external skin 4 have a thickness which decreases at the trailing edge 14. In the alternative illustrated in FIG. 2, both the thickness of the first external skin 3 and of the second external skin 4 decrease in order to thin the leading edge 13 and the trailing edge 14 of the blade.

As illustrated in FIG. 4, the part 1 is manufactured according to the following method:

100: manufacturing the first fibrous reinforcement 31 and the second fibrous reinforcement 41 by three-dimensional weaving. During this manufacturing step 100 of the fibrous reinforcements 31, 41, the debound regions 52 can be produced if platforms 5 need to be formed.

200: placing the first fibrous reinforcement 31 and the second fibrous reinforcement 41 around the central core 2 so as to surround said central core 2, the first fibrous reinforcement 31 being disposed and shaped against the first face of the central core 2 and the second fibrous reinforcement 41 being disposed and shaped against the second face of the central core 2. The first fibrous reinforcement 31 and the second fibrous reinforcement 41 can, for example, be glued on the central core 2.

300: densifying the first fibrous reinforcement 31 and the second fibrous reinforcement 41 in order to form the first external skin 3 and the second external skin 4. The first fibrous reinforcement 31 and the second fibrous reinforcement 41 are densified by injecting a matrix precursor material, for example a filled or not-filled resin, in the pores of the fibrous reinforcements, then polymerising the precursor material.

The invention claimed is:

1. A turbomachine part comprising:

a central core made of a rigid cellular material, which comprises a first face and a second face opposite the first face, wherein the central core is free of composite material comprising a fibrous reinforcement woven according to a three-dimensional weaving densified by a matrix, a first external skin made of a composite material with a first fibrous reinforcement woven according to a three-dimensional weaving, the first fibrous reinforcement covering the first face of the central core, a second external skin made of a composite material with a second fibrous reinforcement woven according to a three-dimensional weaving, the second fibrous reinforcement covering the second face of the central core, wherein the first fibrous reinforcement of the first external skin and the second fibrous reinforcement of the second external skin differ in at least one of a weaving pattern, a strand size, a number of woven layers, or a warp-to-weft ratio such that the first and second external skins are structurally distinct from each other.

2. A turbomachine part comprising a central core made of a rigid cellular material, which comprises a first face and a second face opposite the first face, wherein the central core is free of composite material comprising a fibrous reinforcement woven according to a three-dimensional weaving densified by a matrix, and wherein a first face of the central core is covered by a first external skin made of a composite material with a first fibrous reinforcement woven according to a three-dimensional weaving, and wherein a second face of the central core is covered by a second external skin made of a composite material with a second fibrous reinforcement woven according to a three-dimensional weaving, wherein the first and second external skins are distinct from each other, wherein the first fibrous reinforcement and the second fibrous reinforcement have a different weaving pattern.

3. A turbomachine part comprising a central core made of a rigid cellular material, which comprises a first face and a second face opposite the first face, wherein the central core is free of composite material comprising a fibrous reinforcement woven according to a three-dimensional weaving densified by a matrix, and wherein a first face of the central core is covered by a first external skin made of a composite material with a first fibrous reinforcement woven according to a three-dimensional weaving, and wherein a second face of the central core is covered by a second external skin made of a composite material with a second fibrous reinforcement woven according to a three-dimensional weaving, wherein the first and second external skins are distinct from each other, wherein the first fibrous reinforcement and the second fibrous reinforcement have a different strand size.

4. A turbomachine part comprising a central core made of a rigid cellular material, which comprises a first face and a second face opposite the first face, wherein the central core is free of composite material comprising a fibrous reinforcement woven according to a three-dimensional weaving densified by a matrix, and wherein a first face of the central core is covered by a first external skin made of a composite material with a first fibrous reinforcement woven according to a three-dimensional weaving, and wherein a second face of the central core is covered by a second external skin made of a composite material with a second fibrous reinforcement woven according to a three-dimensional weaving, wherein the first and second external skins are distinct from each other, wherein the first fibrous reinforcement and the second fibrous reinforcement have a different number of layers.

5. The part according to claim 1, wherein at least one among the first fibrous reinforcement and the second fibrous reinforcement comprises a first portion having a first strand size, and a second portion having a second strand size.

6. The part according to claim 1, wherein said part comprises a platform formed by at least one debound region formed on the first fibrous reinforcement or the second fibrous reinforcement, said debound region being bent back so as to protrude from said part.

7. The part according to claim 1, wherein a reinforcement ply is located on at least one among the first external skin and the second external skin, the reinforcement ply being a ply woven by two-dimensional weaving, or a ply woven by three-dimensional weaving, or a sheet of unidirectional fibres.

8. The part according to claim 1, wherein said part is a profiled part which comprises a pressure side, a suction side, a leading edge and a trailing edge, the first external skin being disposed on the pressure side, and the second external skin being disposed on the suction side.

9. The part according to claim 8, wherein the first external skin and the second external skin join at the leading edge and at the trailing edge.

10. The part according to claim 9, wherein at least one among the first external skin and the second external skin has a thickness which decreases at the leading edge, and at least one among the first external skin and the second external skin has a thickness which decreases at the trailing edge.

11. The part according to claim 8, wherein the first fibrous reinforcement comprises at least one among:

a weaving pattern different from the weaving pattern of the second fibrous reinforcement, larger strands than the strands of the second fibrous reinforcement, a higher number of layers than the number of layers of the second fibrous reinforcement, a lower warp/weft ratio than the warp/weft ratio of the second fibrous reinforcement.

12. A method for manufacturing a part according to claim 1 comprising:

manufacturing the first fibrous reinforcement and the second fibrous reinforcement by three-dimensional weaving;

placing the first fibrous reinforcement and the second fibrous reinforcement around the central core made of rigid cellular material so as to surround said central core, the first fibrous reinforcement being disposed against the first face of the central core and the second fibrous reinforcement being disposed against the second face of the central core, and densifying the first fibrous reinforcement and the second fibrous reinforcement in order to form the first external skin and the second external skin.

13. The part according to claim 1, wherein the first external skin and the second external skin have respective outer peripheries that are spaced apart and separated from each other by the central core.

* * * * *